United States Patent

[11] 3,593,637

| [72] | Inventors | Paul Fahlenberg<br>Lindenstrasse 16a, Baierbrunn;<br>Wilhelm Pross, Einbracht-Strasse 6a/11,<br>Munich, 9, both of, Germany |
|---|---|---|
| [21] | Appl. No. | 734,628 |
| [22] | Filed | June 5, 1968 |
| [45] | Patented | July 20, 1971 |
| [32] | Priority | July 14, 1967 |
| [33] | | Germany |
| [31] | | C 42 619 |

[54] PHOTOGRAPHIC CAMERA INCLUDING PULSE CONTROLLED SHUTTER
8 Claims, 6 Drawing Figs.

[52] U.S. Cl. .................................................. 95/53
[51] Int. Cl. .................................................. G03b 9/62
[50] Field of Search .................................... 95/53, 58, 53.3

[56] References Cited
UNITED STATES PATENTS

| 3,020,816 | 2/1962 | Frenk | 95/58 |
| 3,249,034 | 5/1966 | Burgarella | 95/53 |
| 3,348,462 | 10/1967 | Fahlenberg | 95/53 |
| 3,386,364 | 6/1968 | Hayden | 95/53 |
| 3,448,671 | 6/1969 | Rentschler | 95/53 |

Primary Examiner—Samuel S. Matthews
Assistant Examiner—Russell E. Adams, Jr.
Attorney—Larson and Taylor ABSTRACT: A photographic camera includes a shutter arrangement wherein the shutter blades are moved between open and closed positions in response to first and second timing pulses produced by a detachable electronic device. The duration of the timing pulses is controlled by a timing circuit which includes a plurality of resistances which may be selectively switched into the timing circuit. The time interval between the first and second pulses controls the exposure time provided by the shutter arrangement and thus by varying the duration of at least one of these pulses possible overlap of the first and second pulses for exposure times of short duration is avoided.

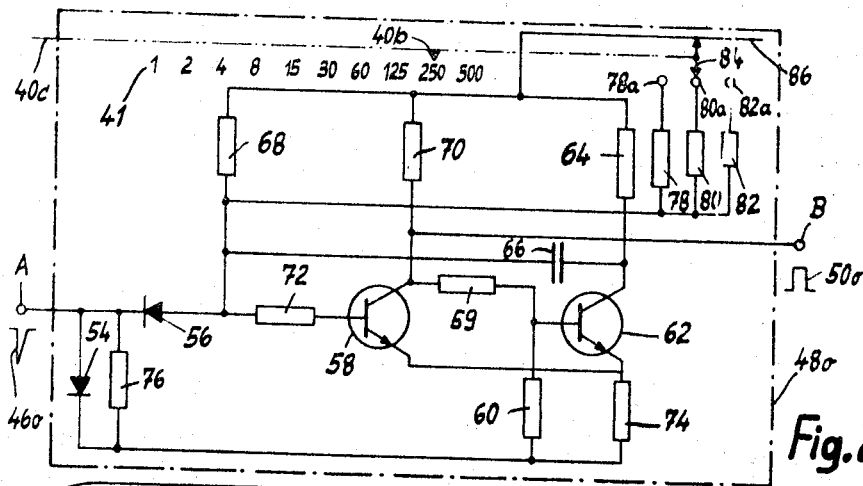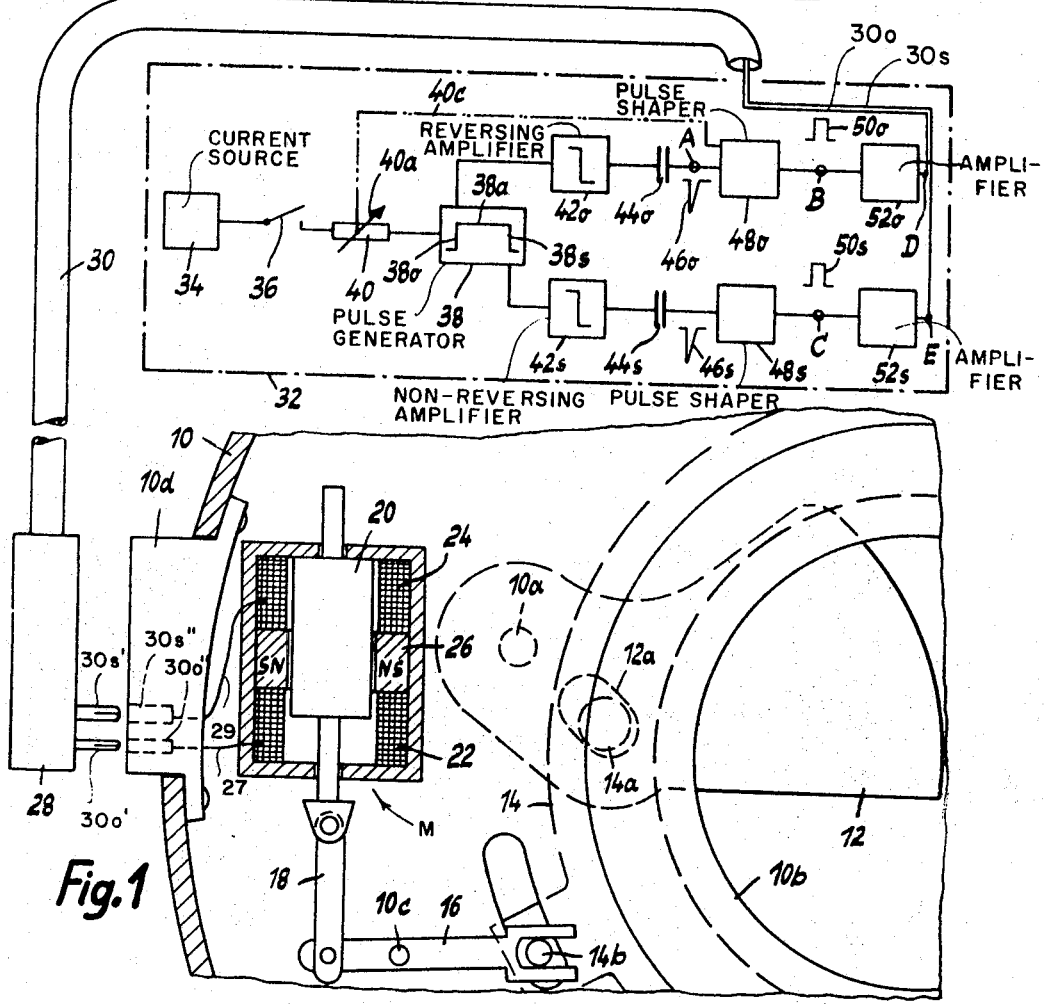

INVENTORS
PAUL FAHLENBERG
WILHELM PROSS
Larson and Taylor
ATTORNEYS

3,593,637

PHOTOGRAPHIC CAMERA INCLUDING PULSE CONTROLLED SHUTTER

BACKGROUND OF THE INVENTION

1. Field of the Invention

The present invention relates to photographic cameras and more particular to electrical means for controlling the effective exposure provided by such cameras.

2. The Prior Art

In accordance with a conventional form of photographic camera the shutter ring of a common shutter arrangement is controlled through movement of the armature of an electronically operated magnetic control device. In cameras of this type first and second timing pulses respectively control the opening movement and the closing movement of the shutter blades, the time interval between the pulses determining the exposure time provided by the shutter arrangement. The duration of the exposure time may be varied by varying the interval between these pulses. In general, control pulses of relatively long duration are employed in that such pulses ensure that the dictated movement of the shutter blades will take place and further prevent the possibility of any "bouncing" effect in the shutter. However, when relatively short exposure periods are desired the use of controlled pulses of relatively long duration is disadvantageous in that, because the interval between the pulses is so short, overlapping of the first and second control pulses may take place with resultant incorrect operation or nonoperation of the shutter as well as possible damage to the electrical control device through shorting out of the battery supply therefor.

Similar problems result from the use of the detachable electrical control device with different shutter arrangements. The minimum exposure provided by a shutter arrangement is generally related to the response of the shutter operating mechanism and these different minimum effective exposure times require, for optimum operation, a control pulse specifically adapted to the characteristics of physical construction of the camera with which the control device is used. Thus a particular electronic control device may perform in an optimum manner with a particular shutter mechanism but the performance thereof may be less than optimum with another shutter mechanism having different physical characteristics.

SUMMARY OF THE INVENTION

In accordance with the present invention the electrical control device for the exposure timing pulses includes control means associated with these electrical means for controlling the duration of at least one of the first and second timing pulses in accordance with a variable factor related to the exposure provided by the shutter arrangement. In accordance with one embodiment of the present invention the variable factor is related to the time interval between the first and second pulses. In a preferred embodiment the electrical means includes a pulse shaper including an RC network and the control means includes a switching network for automatically switching an additional circuit element into the RC timing network to control the duration of the timing pulse. In a presently preferred embodiment the exposure time, i.e., the time between pulses, is selected by adjustment of a control member for a variable resistor, the control member being interconnected with the switching arrangement whereby selection of a particular exposure setting will automatically connect the proper resistor into the RC timing network.

In a second embodiment of the invention the shutter arrangement includes an electromagnetic actuating device for controlling movement of the shutter members, the entire shutter arrangement being located within a shutter housing. The circuit elements comprising the electronic device are located in a separate housing which is detachably coupled to the shutter arrangement through a flexible cable to provide remote operation of the shutter arrangement. In accordance with the invention control means for controlling the pulse width of at least one of the first and second timing pulses is automatically connected into circuit relationship with the electrical control device when the electrical control device is connected to the shutter arrangement, the pulse width dictated by the control means being related to the exposure provided by the particular shutter arrangement.

It should be noted that the two embodiments described above are not mutually exclusive and the features thereof may be combined into a single apparatus. In accordance with a further feature of the present invention further electronic means are provided to vary the waveshape of the timing pulses so that a particular waveshape, such as a portion of sine wave, may be provided for a particular shutter arrangement.

Other features and advantages of the present invention will be set forth in or apparent from the detailed description of the preferred embodiments of the invention found hereinbelow.

BRIEF DESCRIPTION OF THE DRAWINGS

FIG. 1 is a generally schematic representation of a first embodiment of the invention including a circuit diagram of the electronic control device therefor;

FIG. 2 is a schematic diagram of a portion of the circuit of FIG. 1;

DESCRIPTION OF THE PREFERRED EMBODIMENTS

Figure 4:
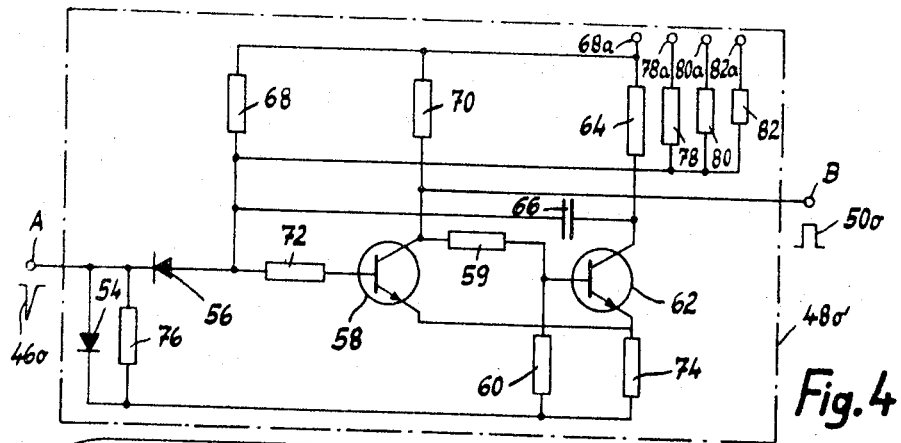
FIG. 4 is a schematic diagram of a portion of the circuit of FIG. 3.

Referring to FIG. 1, a portion of a photographic camera includes a number of shutter blades mounted within a shutter housing generally denoted 10 (only one shutter blade 12 actually being shown in FIG. 1 for purpose of clarity). Shutter blade 12 is pivotally mounted by a pivot pin 10a and includes a control slot 12a therein which is adapted to receive a control pin 14a mounted on a shutter drive ring 14. Drive ring 14 is mounted for rotation about the objective aperture 10b of the shutter housing and includes a drive pin 14b mounted on an outwardly extending portion thereof. Pin 14b is received in a slot in one end of a double-armed drive lever 16 which pivots about a pivot pin 10c fixed to shutter housing 10. The other end of lever 26 is pivotally secured to a linkage 18 which is connected through suitable connecting means to the armature 20 of an electromagnetic control device generally denoted M.

Control device M includes first and second magnetic windings 22 and 24 which are separated from one another by an intermediate permanent magnet 26 of generally annular construction. Permanent magnet 26 amplifies the effectiveness of magnetic windings 22, 24 and acts to maintain armature 20 in the end position thereof as is described hereinbelow. Reference is made to commonly assigned copending U.S. Pat. Application Ser. No. 594,167 for further details of the operation of the electromagnetic control device.

Magnetic control device M is mounted within the shutter housing as shown and is connected through first and second conductors 27 and 29 to a contact socket 10d which extends outwardly of shutter housing 10. Contact socket 10d includes first and second socket recessed 30s'' and 30o'' adapted to receive contact pins 30s' and 30o' of a contact plug 28. A cable 30 connects contact plug 28 with an electronic control device generally denoted 32 which provides controlled timing pulses for actuating electromagnetic control device M.

Included within the housing for the control device 32 is a current source 34 which conveniently may be a battery. A switch 36, in the closed position thereof connects source 34 with a control pulse generator 38 which produces rectangular electrical control pulses as indicated by pulse 38a. A variable resistor 40 included in the series connection between current source 34 and pulse generator 38 provided means for varying the duration of the control pulse 38a produced by pulse generator 38. A manual setting member 40a for varying the value of resistor 40 is interconnected by a connecting member indicated schematically at 40c to a control switch 84 (see FIG. 2) described hereinbelow. Interconnecting member 40c includes an indicating marker 40b which cooperates with a fixed exposure scale 41 to provide an indication of the exposure setting dictated by the selected value of resistance 40. The value of resistance 40 will determine the width of pulse 38a and thus as is more fully described hereinbelow the effective exposure time provided by the shutter mechanism.

The output of pulse generator 38 is fed through a reversing amplifier 42o and a differentiating capacitor 44o to a pulse shaper 48o and the leading edge 38s of control pulse 38a is converted by amplifier 42o and capacitor 44o into a negative needle pulse or spike 46o. Negative spike 46o is converted by pulse shaper 48o into a rectangular pulse of predetermined duration. The pulse so produced is represented in FIG. 1 at 50o. Pulse 50o is amplified in power amplifier 52o and the resultant pulse is transmitted through a conductor 30o within cable 30 through the connection between contact plug 28 and socket 10d and conductor 27 to magnetic winding 22.

In a similar manner the trailing edge 38o of control pulse 38a is converted by a nonreversing amplifier 42s and a differentiating capacitor 44s into a negative spike 46s. Spike 46s is similarly converted by a pulse shaper 48s into a rectangular pulse 50s which is amplified by a power amplifier 52s and passes through conductor 30s, contact plug 28, contact socket 10d and conductor 29 to magnetic winding 24.

Pulse generator 38, amplifiers 42o and 42s and power amplifiers 50o and 42s are conventional and any suitable devices for performing the noted functions may be utilized in control device 32. Thus further discussion of the details of construction of these elements is deemed unnecessary.

The pulse shaper 48o is preferably of the design shown in FIG. 2, the circuit shown being basically a Schmitt trigger having an associated RC timing network. FIGS. 1 and 2 may be related by noting the positions of terminals A and B in FIG. 1. Thus, referring to FIG. 2, terminal A designates the input terminal to pulse generator 48o from differentiating capacitor 44o. Similarly, terminal B designates the output terminal of pulse shaper 48o which is connected to power amplifier 52o.

Pulse shaper 48o generally comprises first and second transistors 58 and 62 together with a timing control circuit therefor. The emitters of transistors 58 and 62 are connected together and the collector of transistor 58 is connected through resistance 59 to the base of transistor 62. A point on the connection between the base of transistor 62 and resistor 59 is connected through a resistor 60 to a point on the connection between a resistor 74 connected to the emitters of transistors 58, 60 and the parallel combination of a diode 54 and a resistor 76 connected to input terminal A. A further diode 56 is connected between the junction of the connection of the parallel combination of diode 54 and resistor 76 and output terminal A to a point on the connection between a resistor 72 connected to the base of transistor 58 and capacitor 66 connected to the collector of transistor 62. Two additional resistors 68 and 70 are connected as shown with resistor 70 being connected to the collector of transistor 58 and a further resistor 64 being connected to the collector of transistor 62. A series of resistors 78, 80 and 82 are connected between a point on the connection between resistor 68 and the connection between diode 56 and resistor 72 to a conductor 86. Output terminal B is connected to a point on the connection between the collector of transistor 58 and resistance 70.

In operation, a negative spike 46o appearing at input terminal A is coupled through diode 56 to the base of transistor 58 which is conducting under normal conditions. Spike 46o will render transistor 58 nonconducting which will result in a rise in voltage at the collector terminal of transistor 58. This voltage rise will be coupled through the voltage divider formed by resistors 59 and 60 to the base of transistor 62 and will render transistor 62 conductive. With transistor 62 conducting there will be a decrease in voltage across resistance 64 as well as on the right-hand plate of capacitor 66 as viewed in FIG. 2. Capacitor 66 will then discharge at a rate dictated by the value of resistance 68 and capacitor 66 to a voltage level such as to turn transistor 58 back on. With transistor 58 turned on transistor 62 will be turned off and the circuit will be returned to normal conditions.

The variation in the voltage across resistor 70 resulting from the change of state of transistor 58 is reflected at the output terminal B in a rectangular pulse 50o the duration of which depends on the values of resistance 68 and capacitor 66.

It is noted that the pulse former 48s need not be of the form shown in FIG. 2 in that exact control of the duration of the closing pulse 50s is not essential. Thus pulse shaper 48s may be of any known form preforming the noted function.

The duration of pulses 50o and 50s is usually constant for a given duration of control pulse 38a. The duration of pulse 38a is varied through adjustment of resistance 40, this duration determining the time interval between pulses 50o and 50s but not varying the duration of the individual pulses 50o and 50s. As set forth hereinbefore, for optimum operation and to avoid possible overlap between pulses 50o and 50s, it is advantageous to reduce the length of at least pulse 50o for short exposure time settings. This reduction in the length of pulse 50o is accomplished through means including resistors 78, 80 and 82 connected in parallel with timing resistor 68. By selectively connecting one of these resistors in parallel with resistor 68 the RC time constant of the timing network for pulse shaper 48o may be varied with consequent variation in the duration of pulse 50o. As is shown diagrammatically in FIG. 2 the setting member 40a for variable resistor 40 of pulse generator 38 is connected through a coupling member 40c to a slider 84 moves over conductor 86 which is preferably a conventional contact strip. Thus movement of setting member 40a will provide consequent movement of slider 84 and depending on the setting of member 40a, possible selection of any of resistors 78, 80 and 82 through contact of slider 84 with resistor terminals 78a, 80a and 82a, respectively.

Regarding the operation of the embodiment of FIGS. 1 and 2 it is noted that closing of switch 36 in control device 32 through a trip mechanism (not shown) produces a signal which is converted in pulse generator 38 into control pulse 38a the length of which is determined by the setting of variable resistor 40. The leading edge 38s is converted, as described hereinabove, into a pulse 50o which passes, after suitable amplification in amplifier 52o to the magnetic winding 22 of magnetic actuating device M. Pulse 50o produces temporary energization of magnetic winding 22 and resultant movement of armature 20 from the rest position shown to an end position in which armature 20, through the linkage mechanism including linkage 18 and double-armed lever 16, provides opening of shutter blades 12. Armature 20 is held by permanent magnet 26 in the end or "open" position thereof until electronic device 32 provides a deactuating pulse. This deactuating pulse is produced, as set forth hereinabove, by converting the trailing edge 38o of the control pulse 38a into a rectangular pulse 50s which is amplified in amplifier 52s and transmitted to magnetic winding 24. Temporary energization of magnetic winding 24 causes attraction of armature 20 upward and movement thereof from the "open" position to the rest position shown in FIG. 1. This movement of armature 20, again through the linkage mechanism including linkage 18 and double-ended lever 16, causes shutter blades 12 to close. Referring to FIG. 2, as illustrated, for setting of marker 40b from 1 second up to one-sixteenth of a second additional resistors 78, 80 and 82 are not connected into the timing circuit and thus resistor 68 is determinative of the duration of pulse 50o. At settings of 1/125 seconds, 1/250 seconds and 1/55 seconds further resistances 78, 80 and 82 are connected into the timing circuit to provide further abbreviation. For example, for settings between one-sixtieth and 1/250 resistor 78 will be connected in the timing circuit whereas at the 1/250 setting smaller resistor 80 will be connected into the timing circuit thus further reducing the effective value of R in the RC time constant. As stated, selection of resistances 78, 80 and 82 is accomplished automatically through the setting of member 40a of resistor 40.

Figure 3:
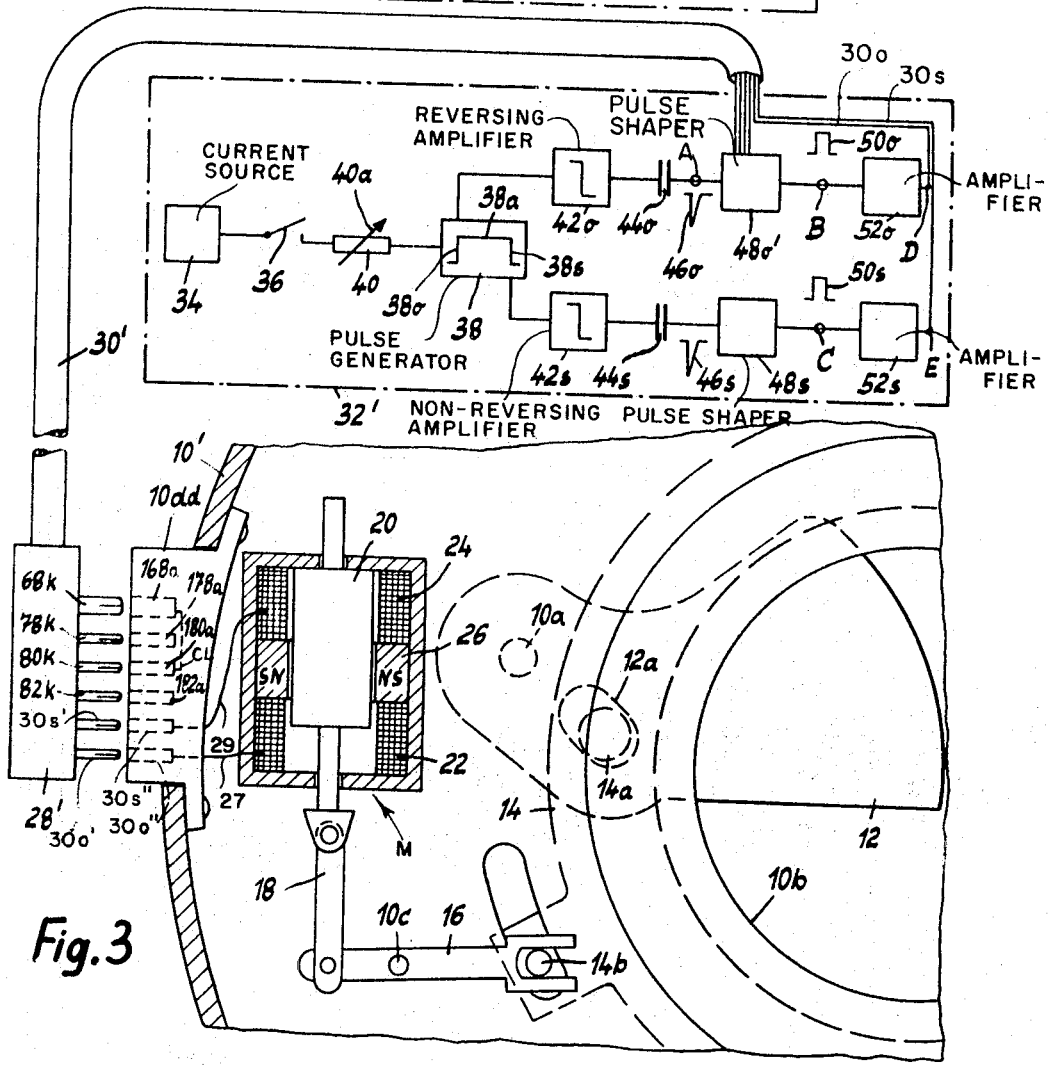
FIG. 3 is a representation similar to that of FIG. 1 of a second embodiment of the invention.

Referring to FIGS. 3 and 4, an alternate embodiment of the present invention is shown. The embodiment of FIGS. 3 and 4 is generally similar to that of FIGS. 1 and 2 and like elements have been given the same numbers. The chief difference between the two embodiments is that whereas in the embodiment of FIGS. 1 and 2 the length of control pulse 50o was varied in accordance with the selected exposure time as dictated by the value of resistor 40, in the embodiment of FIGS. 3 and 4 the length of control pulse 50o is varied in accordance with the physical characteristics of the particular shutter mechanism with which electronic control device 32' is used. As set forth hereinabove, the mechanical construction of a particular shutter mechanism will place limits on the minimum exposure period which can be provided by that shutter mechanism. Thus, shutters which are capable of providing a very short exposure time require, for optimum performance, a control pulse of shorter duration than would be required in a relatively slow-acting shutter. Thus, in accordance with the present invention, a control resistor similar to those utilized in the embodiment of FIGS. 1 and 2 and of a value corresponding to the particular mechanical characteristics of the shutter mechanism with which control device 32' is used is automatically connected into the timing circuit of control device 32' when that particular shutter mechanism is employed.

Referring to FIG. 3 contact plug 10dd is provided with a number of further socket recesses 168a, 178a, 180a, and 182a adapted to receive contact pins 68k, 78k, 80k and 82k of socket plug 28'. These contact pins are connected through corresponding conductors in cable 30' to associated contact terminals 68a, 78a, 80a and 82a located within pulse shaper 48o'. Varying the position of a connecting lead CL will provide a number of different resistor connections and consequently a number of different RC time constants for the timing circuit of pulse shaper 48o'. In this regard, socket recess 168a may be connected to any of the further socket recesses 178a, 180a, and 182a or may remain unconnected. As illustrated, socket recess 168a is connected to socket recess 180a through connecting lead CL and thus resistance 80 is connected into the RC timing circuit through contact pins 68k and 80k and corresponding conductor within cable 30'. Thus, depending on the physical characteristics of the shutter mechanism any of resistors 78, 80 and 82 may be connected into the timing circuit or left unconnected such that resistance 68 determines the duration of pulse 50o. It is noted that in each instance although pulse 50o will be of a predetermined duration according to the particular resistances connected into the timing circuit the duration of pulse 50o will be constant for each setting of setting member 40a of variable resistor 40, that is, the duration of pulse 50o determined by the RC timing network of pulse shaper 48o' will remain constant independent of the duration of control pulse 38a.

It is noted that the automatic control of pulse length provided in the embodiment of FIGS. 1 and 2 may be incorporated into the embodiment of FIGS. 3 and 4. In such an arrangement, the pulse length of pulse 50o would be variable in accordance with the setting of variable resistor 40 and would be of minimum duration determined by the physical characteristics of the particular shutter mechanism with which the control device was used. It is further noted that the series of resistors 78, 80 and 82 utilized in the embodiment of FIG. 3 and 4 could be replaced by a single resistor, mounted within contact socket 10dd, of a predetermined value in accordance with the characteristics of that particular shutter mechanism. With this arrangement the additional resistance would be automatically connected into the timing circuit for pulse shaper 48o' upon plugging contact plug 28' into contact socket 10dd.

Figure 5:
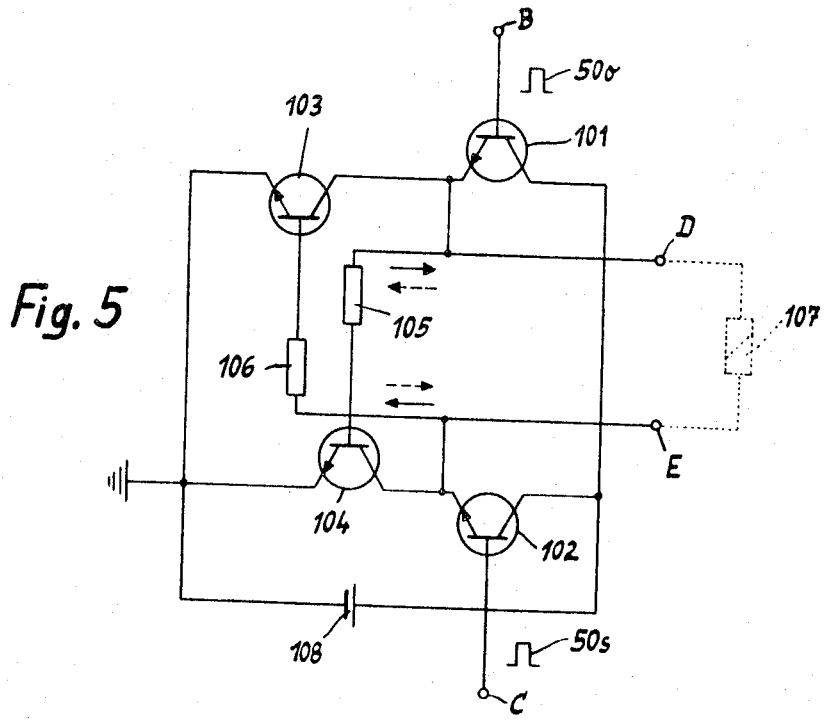
FIG. 5 is a schematic diagram of a pulse converting circuit usable with another embodiment of the invention.

It is further noted that the present invention is also applicable to an embodiment including a magnetic actuating device comprising a single magnetic winding the polarity of which controls the movement of the armature. It is noted that the use of reduced duration control pulses is particularly important is such an arrangement in that where the opening pulse corresponding to pulse 50o is relatively long there is the distinct possibility of the closing pulse corresponding to pulse 50s overlapping the opening pulse which could, among other effects, produce short circuiting of the supply source. In accordance with the present invention a pulse converting circuit as shown in FIG. 5 may be incorporated into the embodiments of FIGS. 1 and 2, and 3 and 4 where such a magnetic actuating device is used. The pulse converting circuit of FIG. 5 would replace power amplifiers 52o and 52s and would be connected such that terminals B, C, D and E are connected at the corresponding terminals in FIGS. 1 and 3. The pulse converting circuit is essentially a transistor bridge comprising transistors 101, 102, 103 and 104 connected as shown. Because the interconnections between the transistors are similar only an exemplary portion of the circuit will be considered. The base of transistor 104 is connected through a resistance 105 to the emitter of transistor 101 while similarly, the base of transistor 103 is connected to the emitter of transistor 102. Output terminals D and E are connected to the electromagnetic winding of a magnetic actuating device as described hereinabove, magnetic winding 107 being indicated in dotted lines only. Magnetic winding 107 replaces windings 22 and 24 of magnetic control device M of FIGS. 1 and 3 and includes an armature (not shown) which controls a shutter blade ring in a similar manner to that described in connection with magnetic control device M. Magnetic control winding 107 is connected in the central or galvanometer leg of the bridge circuit.

In operation, pulse 50o is applied at input terminal B to turn on transistor 101. With transistor 101 conducting the battery supply voltage of battery 108 is connected in the base-to-emitter circuit of transistor 104 and biases transistor 104 "on." With transistor 101 and 104 conducting current will flow in magnetic winding 107 in the direction indicated by the solid line arrows in FIG. 5. Under these conditions the shutter blades of the shutter mechanism associated with electromagnetic winding 107 are open.

After pulse 50o lapses, closing pulse 50s is applied to terminal C by pulse shaper 48s to the base of transistor 102. Pulse 50s will turn on transistor 102 which will in turn, through the connecting of battery 108 in the base-to-emitter circuit of transistor 103, cause transistor 103 to also be turned on. Under these circumstances, the current flow in winding 107 will flow in the direction indicated by the dotted arrows in FIG. 5 and the shutter blades controlled thereby will be closed.

Figure 6:
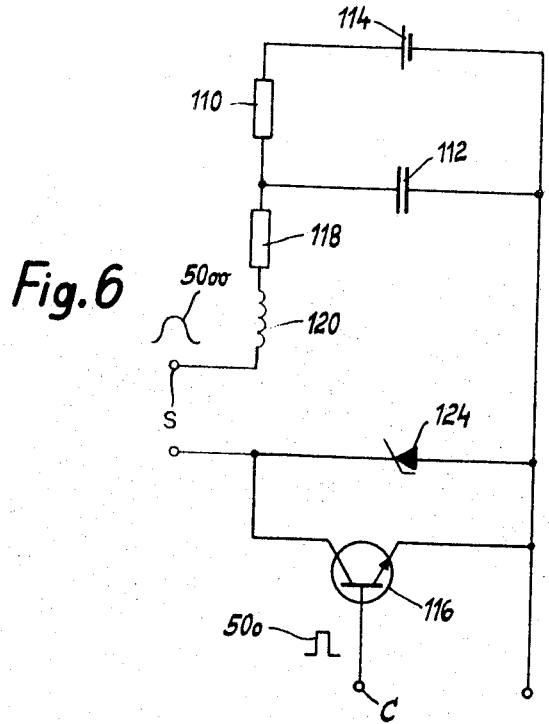
FIG. 6 is a schematic diagram of a wave shaping network suitable for use with any of the embodiments of the invention.

In the embodiments described hereinbefore rectangular pulses have been utilized in energizing the windings of the magnetic shutter control systems. However, under certain circumstances pulse waveforms of different shapes may be better suited to the operating characteristics of the shutter employed. Referring to FIG. 6 there is shown, in accordance with a further feature of the invention, a pulse amplifier for converting a rectangular pulse 50o into a pulse in the form of portion of a sine wave, this pulse being generally denoted 50oo. The circuit of FIG. 1 includes a transistor 116 the base of which is connected to terminal C and the collector-to-emitter path of which is connected in parallel with a Zener diode 124 and the series combination of resistor 110 and a battery 114. A capacitor 112 is connected across the series combination of resistor 110 and battery 114, and a resistor 118 and inductor 120 are connected between the junction of resistor 110 and capacitor 112 and the junction of the collector of transistor 116 and Zener diode 124. An output terminal S is connected to this latter junction. Terminal S is connected to a magnetic winding (not shown) of a suitable magnetic shutter control device as described hereinabove. Under normal conditions, capacitor 112 is charged to the voltage supplied by battery 113 through resistance 110. Upon application of a pulse 50o to the base of transistor 116, transistor 116 conducts and capacitor 112 will discharge through resistance 118, inductance 120 and the magnetic winding of the shutter mechanism and transistor 116 to ground. The current waveshape in the magnetic winding will be of sine wave form as shown. Pulse 50oo will energize the control winding of a magnetic control device as described hereinbefore.

Although the invention has been described in some detail with reference to presently preferred embodiments thereof it will be understood that modifications therein may be effected without departing from the scope and spirit of the invention. For example, the duration of timing pulse 50o may be controlled through a plurality of different valued capacitors which would be connected into circuit relationship with capacitor 66 of pulse shaper 48o or 48o'. It will be appreciated that a variation in the capacitance of the RC timing circuit for pulse shapers 48o and 48o' will of course have the same effect as varying the resistance thereof. Further, it is noted that the present invention is not limited to incorporation in a pulse shaper of the type including an RC timing network and that different type pulse shapers may be employed. In accordance with the invention, the output characteristics of such pulse shapers would be made variable in accordance with either the exposure setting or the physical characteristics of the shutter with which the control device is used, or, as suggested above, in accordance with both of these factors. It is noted further that modifications other than those specifically enumerated may also be effected without departing from the scope and spirit of the invention. Thus the scope of the invention is to be determined not from the illustrative embodiments described hereinbefore but rather from the subjoined claims.

Having described my invention in accordance with the requirements of the Patent Statutes,

We claim:

1. In an arrangement for controlling the exposure provided by a photographic camera including at least one shutter member movable between open and closed positions, pulse operated means for moving said at least one shutter member, electrical control means for producing a first electrical pulse for controlling the opening movement of said at least one shutter member and for producing a second electrical pulse for controlling the closing movement of said at least one shutter member, the time interval between said pulses determining the effective exposure time provided, and setting means for selectively setting the time interval between the first and second pulses, the improvement comprising electrical compensating means for compensatingly varying the duration of at least one of the first and second pulses, adjusting means for selectively adjusting the amount of variation in pulse duration provided by said compensating means so as to determine the pulse duration of at least one of said first and second pulses, and coupling means connected between said setting means and said adjusting means for automatically determining the adjustment provided by said adjustment means, in accordance with the setting of said setting means, so as to automatically vary the duration of said at least one of said first and second pulses in accordance with the time interval between said first and second pulses.

2. An arrangement as claimed in claim 1 wherein said electrical control means includes pulse shaper means including an RC network and said electrical compensating means includes means for varying the time constant of said RC network in accordance with the setting of said setting means.

3. An arrangement as claimed in claim 2 wherein said electrical compensating means includes a plurality of different valued resistances and said adjusting means comprises a switch means for connecting selected ones of said plurality of resistances into circuit relationship with said RC network.

4. An arrangement as claimed in claim 1 wherein said shutter unit includes magnetic actuating means for controlling the movement of said at least one shutter member, said magnetic actuating means comprising a movable armature and a single electromagnetic winding for controlling the movement of said armature in accordance with the polarity of said electromagnetic winding, said electrical control means further including a transistor bridge circuit for converting said first and second pulses into polarity control signals for said electromagnetic winding.

5. An arrangement as claimed in claim 1 further comprising means for controlling the wave shape of at least one of said first and second pulses.

6. An arrangement as claimed in claim 5 wherein the last-named means comprises an inductance, a capacitor, a battery for charging said capacitor, and a transistor for providing, in the conductive state thereof, a discharge path for said capacitor, said path including said inductance.

7. In an improved arrangement for controlling the exposure provided by a photographic camera comprising a shutter unit including at least one shutter movable between open and closed position, and pulse operated electromagnetic means for causing movement of said at least one shutter member; a second, separate unit comprising electrical control means for producing a first electrical pulse for controlling the opening movement of said at least one shutter member and for producing a second electrical pulse for controlling the closing movement of at least one shutter member, the said pulses determining the effective exposure time provided, setting means for selectively setting the time interval between the first and second pulses; and connecting means for detachably connecting said pulse operated means of said shutter unit and said electrical control means of said second, separate unit, the improvement comprising electrical compensating means mounted in said separate unit for compensatingly varying the duration of at least one of the first and second pulses, connecting means connected between said shutter unit and said separate unit for, upon connection of said shutter unit and said separate unit, automatically connecting said compensating means and said electrical control means so as to automatically compensatingly vary the duration of at least one of said first and second pulses in accordance with the exposure time provided by the shutter unit utilized.

8. An arrangement as claimed in claim 7 wherein the electrical control means is connected to said electromagnetic means through a flexible cable means and said compensating means including a plurality of different valued resistances for determining the duration at least one of said first and second pulses, said flexible cable means including means for providing connection of selected ones of said resistances into circuit relationship with said electrical control means in accordance with the minimum exposure time provided by the particular shutter unit with which the electrical control means is used.